United States Patent [19]
Brown

[11] Patent Number: 5,291,672
[45] Date of Patent: Mar. 8, 1994

[54] SOUND SUPPRESSION MIXER

[75] Inventor: William H. Brown, West Chester, Ohio

[73] Assignee: General Electric Company, Cincinnati, Ohio

[21] Appl. No.: 987,833

[22] Filed: Dec. 9, 1992

[51] Int. Cl.$^5$ .............................................. F02K 1/38
[52] U.S. Cl. ....................... 60/262; 181/213; 181/219; 181/220; 244/1 N; 239/265.13
[58] Field of Search ................. 60/261, 262; 181/219, 181/220, 213; 239/265.13; 244/1 N

[56] References Cited

U.S. PATENT DOCUMENTS

| | | | |
|---|---|---|---|
| 3,053,340 | 9/1962 | Kutney | 181/33 |
| 3,061,038 | 10/1962 | Lawler et al. | 239/265.13 |
| 3,534,831 | 10/1970 | Nagamatsu et al. | 181/51 |
| 3,543,877 | 12/1970 | Rauvier et al. | 181/51 |
| 3,579,993 | 5/1971 | Tanner et al. | 60/262 |
| 3,587,973 | 6/1971 | Wolf et al. | 239/265.13 |
| 3,927,522 | 12/1975 | Bryce et al. | 60/264 |
| 4,106,587 | 8/1978 | Nash et al. | 181/213 |
| 4,199,936 | 4/1980 | Cowan et al. | 60/226 R |
| 4,293,053 | 10/1981 | Shuttleworth et al. | 181/213 |
| 4,422,524 | 12/1983 | Osborn | 181/215 |
| 5,154,052 | 10/1992 | Giffin, III et al. | 60/262 |

FOREIGN PATENT DOCUMENTS

| | | |
|---|---|---|
| 659621 | 3/1963 | Canada . |
| 2723639 | 5/1977 | Fed. Rep. of Germany ........ 60/262 |
| 849502 | 9/1970 | United Kingdom . |

OTHER PUBLICATIONS

I. Das et al, "Aeroacoustics of Supersonic Porous Plug Nozzle Flows," Apr. 1983, AIAA Paper No AIAA-83-0775, 14 pages and FIGS. 1-5.

Maestrello, "Initial Results of a Porous Plug Nozzle For Supersonic Jet Noise Suppression," Nov. 1978, NASA Technical Memo. TM78802, 11 pages and FIGS. 1-9.

Maestrello, "An Experimental Study on Porous Plug Jet Noise Suppressor," Mar. 1979, Preprint of AIAA Paper No.79-0673, 9 pages.

Kibens et al, "Noise Reduction Mechanisms in Supersonic Jets with Porous Centerbodies," 11-13 Apr. 1983, AIAA Paper No. 83-0774, pp. 678-684.

Das et al, "Short Conical Solid/Perforated Plug-Nozzle as Supersonic Jet Noise Suppressor," Dec. 1991, Journal of Sound and Vibration, pp: 391-406.

Bauer et al, "Noise Generated by Boundary-Layer Interaction with Perforated Acoustic Liners," Jan. 26-28 1975, AIAA Paper No. 76-41, J. Aircraft, vol. 14, No. 2, Feb. 1977, pp. 157-160.

Primary Examiner—Richard A. Bertsch
Assistant Examiner—W. J. Wicker
Attorney, Agent, or Firm—Jerome C. Squillaro; Nathan D. Herkamp

[57] ABSTRACT

A gas turbine engine flow mixer includes at least one chute having first and second spaced apart sidewalls joined together at a leading edge, with the sidewalls having first and second trailing edges defining therebetween a chute outlet. The first trailing edge is spaced longitudinally downstream from the second trailing edge for defining a septum in the first sidewall extending downstream from the second trailing edge. The septum includes a plurality of noise attenuating apertures.

11 Claims, 2 Drawing Sheets

5,291,672

SOUND SUPPRESSION MIXER

The U.S. Government has rights in this invention in accordance with NASA Contract No. NAS3-25415.

The present invention relates generally to gas turbine engines, and, more specifically, to sound suppression of exhaust gases therefrom.

BACKGROUND OF THE INVENTION

An aircraft gas turbine engine discharges exhaust gases in a jet at high velocity for propelling the aircraft in flight. The exhaust gases expand into the ambient air upon discharge from the engine and generate considerable jet noise. Various techniques are known for reducing jet noise including specially designed exhaust nozzles for reducing noise due to shock waves; convergent-divergent (CD) nozzles to reduce noise due to shock waves; suppressor nozzles to shift generated noise to frequencies that are more readily absorbed by the atmosphere or acoustic liners; ejectors for mixing the exhaust gases with ambient airflow to reduce the mean jet velocity and, thereby, noise; and porous plug nozzles to promote mutual cancellation between expansion and compression waves.

These various noise suppression techniques operate at varying effectiveness and with varying penalties in terms of propulsion system size, weight, efficiency, performance, and cost, for example. Accordingly, improved sound suppression devices are desirable for effectively suppressing noise in a simple structural arrangement, with minimal drag losses and performance penalties while being readily manufacturable.

SUMMARY OF THE INVENTION

A gas turbine engine flow mixer includes at least one chute having first and second spaced apart sidewalls joined together at a leading edge, with the sidewalls having first and second trailing edges defining therebetween a chute outlet. The first trailing edge is spaced longitudinally downstream from the second trailing edge for defining a septum in the first sidewall extending downstream from the second trailing edge. The septum includes a plurality of noise attenuating apertures.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
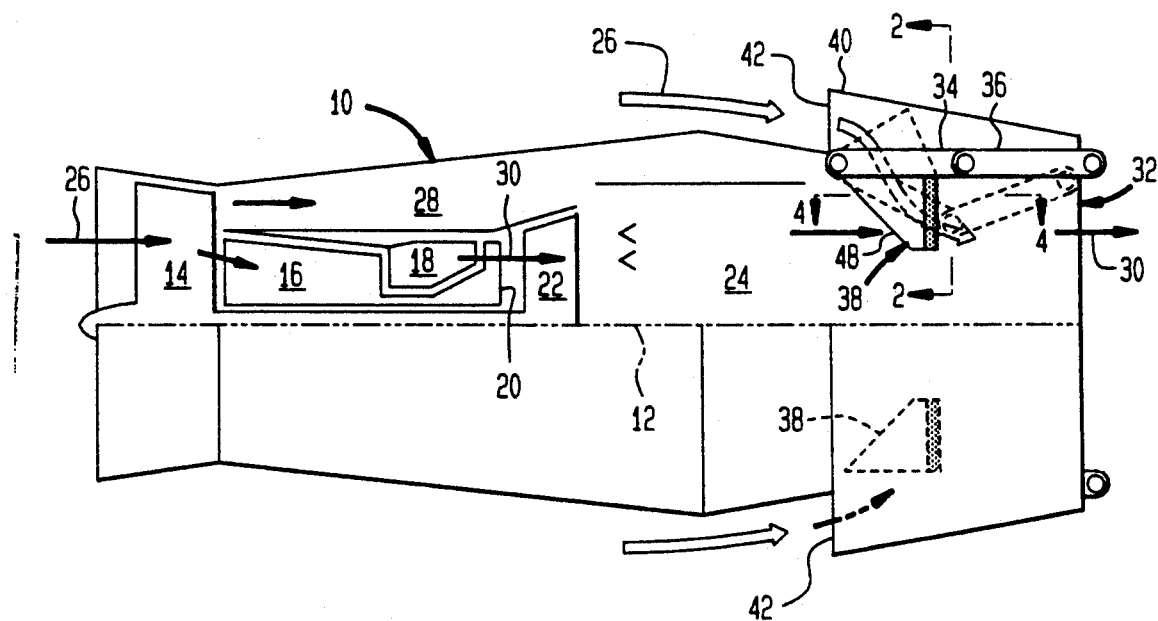
FIG. 1 is a schematic representation of an exemplary turbofan gas turbine engine for powering an aircraft in flight which includes a sound suppression mixer in accordance with one embodiment of the present invention.

Illustrated schematically in FIG. 1 is an exemplary turbofan gas turbine engine 10 effective for powering an aircraft at subsonic and supersonic velocities. The engine 10 includes in serial flow communication about a longitudinal centerline axis 12 conventional components including a fan 14, a compressor 16, combustor 18, high pressure turbine (HPT) 20, a low pressure turbine (LPT) 22, and an afterburner or augmenter 24. The fan 14 is powered by the LPT 22 through a shaft extending therebetween, and the compressor 16 is powered by the HPT 20 through another shaft extending therebetween.

During operation, ambient airflow 26 enters the fan 14 and an outer portion bypasses the compressor 16 through an annular bypass duct 28, and an inner portion is compressed by the compressor 16. The compressed airflow is then channeled to the combustor 18, mixed with fuel and ignited for generating combustion or exhaust gases 30 which flow through the HPT 20 and the LPT 22 which extract energy therefrom for powering the compressor 16 and the fan 14, respectively.

During dry operation of the engine 10, the exhaust gases 30 are simply discharged from the afterburner 24 through a conventional converging-diverging (CD) nozzle 32. The exhaust nozzle 32 is a two-dimensional (2-D) nozzle in this exemplary embodiment, although in alternate embodiments it may be axisymmetric, and includes selectively positionable primary flaps 34 and secondary flaps 36 joined thereto for varying both the throat area and the discharge flow area of the nozzle 32. In wet operation, additional fuel is added to the exhaust gases 30 in the afterburner 24 and ignited for generating additional thrust for propelling the aircraft powered by the engine 10 at maximum velocity.

During takeoff operation of the engine 10 for providing suitable thrust for takeoff operation of the aircraft, considerable noise is generated by the exhaust gases 30 discharged from the exhaust nozzle 32. In order to attenuate or suppress the noise from the exhaust gases 30, a plurality of transversely spaced apart chutes 38 are used in combination with the CD nozzle 32 for mixing the ambient airflow 26 with the exhaust gases 30 inside the nozzle 32. As shown in FIG. 1, the exhaust nozzle 32 also includes a conventional ejector 40 having an inlet 42 for receiving the ambient airflow 26 from outside the engine 10, with the ejector inlet 42 being disposed in flow communication through a suitable duct with the chutes 38 for channeling the airflow 26 therethrough for mixing with the exhaust gases 30.

Figure 2:
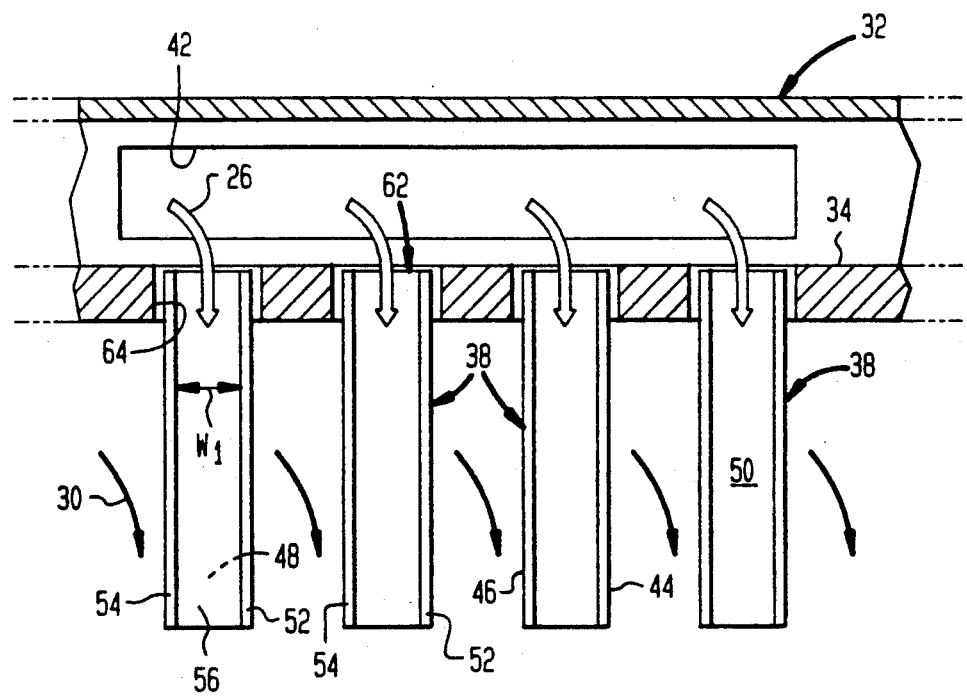
FIG. 2 is a transverse, partly sectional view of the exhaust nozzle of the engine illustrated in FIG. 1 showing in more particularity a plurality of spaced apart mixer chutes taken along line 2—2.
Figure 3:
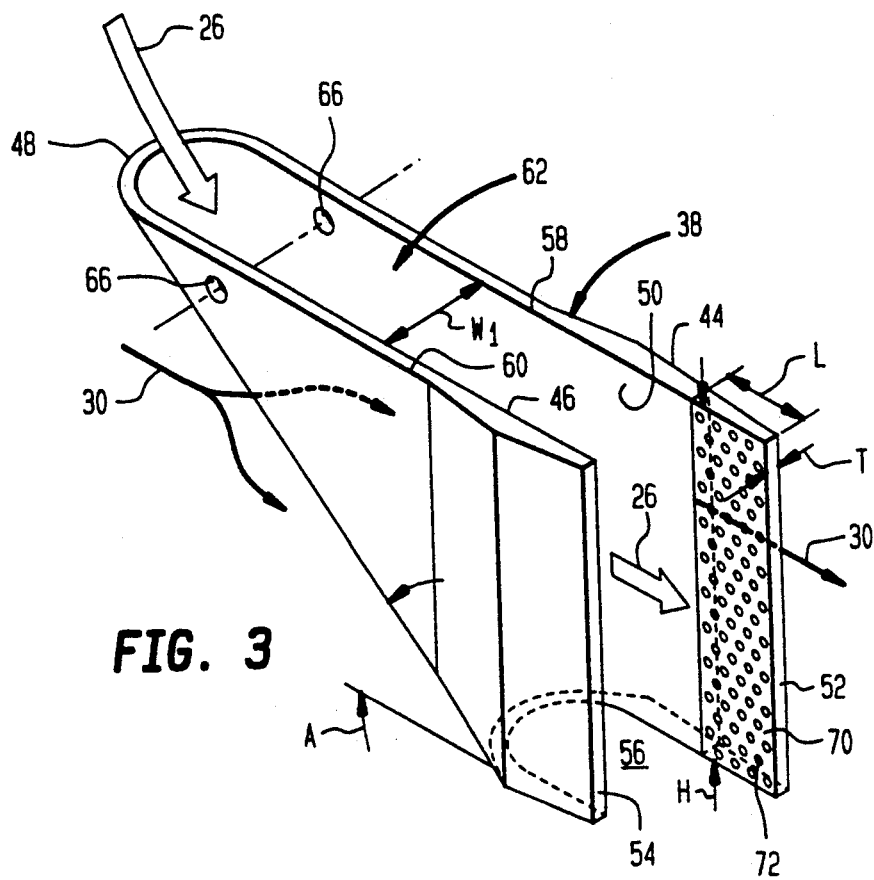
FIG. 3 is a perspective view of an exemplary one of the chutes illustrated in FIGS. 1 and 2.

As shown in FIGS. 2 and 3, each of the chutes 38 is generally U-shaped and has first and second longitudinally extending and transversely spaced apart sidewalls 44, 46 joined together at an arcuate leading edge 48 over which are flowable the exhaust gases 30. The first and second sidewalls 44, 46 are generally parallel to each other in this exemplary embodiment and transversely spaced apart at a first width $W_1$ to define therebetween a first channel 50 for channeling the airflow 26 therethrough. The first and second sidewalls 44, 46 further include respective first and second trailing edges 52, 54 defining therebetween an elongate chute outlet 56 for discharging the airflow 26 from inside the chute 38 for mixing with the exhaust gases 30 channeled outside the chute 38.

As shown in FIG. 3, the chute first and second sidewalls 44 and 46 are generally triangular in this exemplary embodiment, and the chute leading edge 48 is inclined relative to the chute first and second trailing edges 52, 54 in an upstream direction from the bottom of the chute 38 to the top of the chute 38 at an inclination angle A of about 30°, for example, measured relative to the engine longitudinal axis 12 when the chute 38 is in its fully deployed position. The first and second sidewalls 44, 46 have respective first and second top edges 58, 60 which extend from the leading edge 48 to the first and second trailing edges 52, 54, respectively, and are spaced transversely apart to define a chute inlet 62 disposed in flow communication with the ejector inlet 42 (FIGS. 1 and 2) for receiving the ambient airflow 26 therefrom when required.

In the embodiment of the chutes 38 in combination with the 2-D exhaust nozzle 32 as illustrated in FIGS. 1 and 2, the chutes 38 are laterally or horizontally spaced apart from each other in a vertical plane with the chute inlets 62 being aligned in a common horizontal plane. The chutes 38 are preferably disposed at an upstream end of the exhaust nozzle 32 and are conventionally selectively extendable inwardly into the exhaust gases 30 flowable through the exhaust nozzle 32, as well as being retractable therefrom. As shown in solid line in FIG. 1, the primary and secondary flaps 34 and 36 are selectively positioned by a conventional actuator for obtaining maximum discharge flow area, and the chutes 38 are selectively positioned to extend radially inwardly from the primary flaps 34 into the exhaust gases 30. And shown in phantom line in FIG. 1, the chutes 38 are retracted upwardly through the primary flaps 34, and the primary and secondary flaps 34 and 36 are repositioned for decreasing the discharge flow area of the exhaust nozzle 32. The primary and secondary flaps 34 and 36 are conventionally configured and actuated for obtaining all required contours thereof as is conventionally known, and the chutes 38 extend through respective deployment apertures 64 in the primary flaps 34 as illustrated in FIG. 2, and are conventionally selectively retractable and extendable relative to the primary flaps 34. For example, FIG. 3 illustrates pivot apertures 66 at the upstream end of the chute 38 at which the chute 38 may be pivotally mounted to the primary flap 34 and suitably pivoted relative thereto by a conventional actuator which raises and lowers the chute 38 relative to the primary flap 34.

Figure 4:
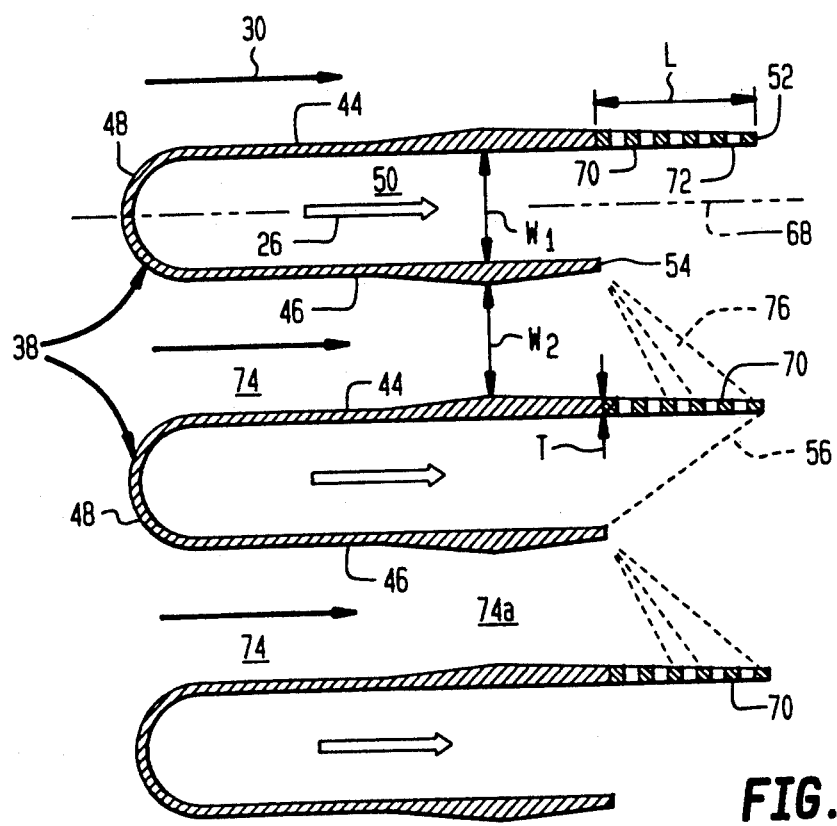
FIG. 4 is a transverse sectional view of adjacent ones of the chutes illustrated in FIG. 1 taken along line 4—4.

Referring again to FIG. 3, and additionally to FIG. 4, the chute first trailing edge 52 is spaced longitudinally downstream from the second trailing edge 54 relative to a longitudinal axis 68 disposed equidistantly between the first and second sidewalls 44, 46 for defining a perforated extension or septum 70 of the first sidewall 44 which extends downstream from or relative to the second trailing edge 54 for a longitudinal length L. The septum 70 has a plurality of spaced apart apertures 72 for attenuating shock noise generated upon mixing of the exhaust gases 30 and the airflow 26. The septum 70 and the remainder of the first sidewall 44 preferably join together at a common thickness T without discontinuity which may be obtained by manufacturing the entire chute 38 from a common piece of sheet metal or by casting. The apertures 72 preferably extend completely through the septum 70, and the chutes 38 are preferably otherwise imperforate except for the apertures 72 in the septums 70.

Referring again to FIG. 4, the first and second sidewalls 44 and 46 of adjacent ones of the chutes 38 preferably face each other for defining therebetween a second channel 74 between each pair of chutes 38 for channeling the exhaust gases 30 therebetween. The second channel 74 may have a constant flow area in the downstream direction; or may be a converging channel having a decreasing flow area; or, in the preferred embodiment, forms a converging-diverging channel 74 as shown in FIG. 4, with a chute throat 74a defined between the sidewalls 44, 46 of adjacent chutes 38. The chutes 38 are transversely aligned with each other with the aft most first trailing edges 52 of the chutes 38 being transversely aligned in a first common axial plane; the second trailing edges 54 of the chutes 38 being transversely aligned in a second common axial plane disposed upstream of the first common plane; and the leading edges 48 of the chutes 38 also being transversely aligned in a third common axial plane disposed upstream of the second common axial plane. The septums 70 of adjacent chutes 38 face each other without obstruction from the chute second trailing edges 54 and are parallel to each other in this exemplary embodiment.

As shown in FIGS. 1 and 2, when sound suppression is desired, the chutes 38 are deployed inwardly into the exhaust gases 30, and the ambient airflow 26 is channeled through the ejector inlet 42 and through the chute inlets 62 for flow through the respective first channels 50. Accordingly, noise from the exhaust gases 30 is attenuated in part by the mixing action of the slower ambient airflow 26 discharged from the chute outlets 56, as shown in FIGS. 3 and 4, into the several second channels 74 through which the faster exhaust gases 30 flow. As the exhaust gases 30 flow through the second channel 74 they expand as their pressure is decreased since this pressure must eventually match that of the ambient airflow outside the exhaust nozzle 32 into which the exhaust gases 30 are discharged. If the exhaust gases 30 in the second channels 74 are either overexpanded or underexpanded upon reaching the chute second trailing edges 54 at which they meet the ejector airflow 26 discharged from the first channels 50, pressure or shock waves indicated schematically at 76 will be formed. These pressure waves 76 ordinarily will increase noise of the exhaust gases 30, but are attenuated by the septums 70 in accordance with the present invention. The length L of the septum 70 in the flow direction is predeterminedly selected to ensure that the pressure waves emanating from the chute second trailing edges 54 are allowed to reflect against the septums 70. The porosity of the septum apertures 72 is the total area of the apertures 72 relative to the total area of the septum 70 including the apertures 72 and is selected for maximizing the attenuation of noise from the pressure waves 76. For example, the porosity of the apertures 72 may be up to about 10%, with the individual apertures 72 being sized and spaced apart for producing noise canceling reflection waves.

More specifically, if the exhaust gases 30 flowing through the second channels 74 are overexpanded relative to the airflow 26 being channeled through the first channels 50, the pressure waves 76 will be compression waves which will reflect as expansion waves upon meeting the septum apertures 72 for canceling noise. If the exhaust gases 30 flowing through the second channels 74 are underexpanded relative to the airflow 26 flowing through the first channels 50, the pressure waves 76 will be expansion waves which will reflect as compression waves upon meeting the septum apertures 72 for also canceling noise. Of course, the pressure waves 76 which reflect off the flat portions of the septum 70 between the apertures 72 reflect therefrom without changing to the opposing canceling wave.

Each of the second channels 74 has a transverse width $W_2$ between the adjacent first and second sidewalls 44 and 46 of adjacent chutes 38 at the chute throat 74a, and the ratio of the septum streamwise length L to the second channel width $W_2$ is predetermined for each design application for allowing the pressure waves 76 generated at the chute second trailing edges 54 upon mixing of the airflow 26 and the exhaust gases 30 to reflect off the septum 70 for attenuating noise. As shown in FIG. 3, each of the septums 70 preferably extends inwardly for the full vertical extend of the first sidewall 44 and has a height H. In this way, sound suppression is provided for the full vertical extend of each chute 38 where the ejector airflow 26 mixes with the exhaust gases 30. In a preferred embodiment, the ratio of the septum length L to the second channel width $W_2$ is greater than about 2 for allowing the pressure waves 76 to reflect off the septums 70. Of course, the perforated septum 70 itself adds drag to the airflow 26 and exhaust gases 30 which flow over the opposite sides thereof and, therefore, the length L should be only as long as required for obtaining effective sound suppressing reflection of the pressure waves 76 which may be determined for each particular design application either analytically or empirically.

Accordingly, the chutes 38 having the perforated septums 70 as described above provide increased noise suppression when the exhaust gases 30 are imperfectly expanded in the second channels 74. The chutes are relatively simple in structure and relatively thin for allowing the chutes 38 to be readily stowed when not needed for sound suppression, and when extended into the exhaust gases 30 the relative thinness thereof reduces drag penalties. The thin septums 70 are also more closely positionable to the source of pressure of shock waves emanating from the second trailing edges 54, with the plurality of septums 70 associated with the plurality of chutes 38 being effective for localizing noise attenuation where needed.

Although in the preferred embodiment disclosed above, the chutes 38 cooperate in combination with the exhaust nozzle 32 and the ejector 40, they may be used in alternate forms and with different sources of the airflow 26. For example, the bypass airflow channeled through the bypass duct 28 may be suitably channeled through the chutes 38 for mixing with the exhaust gases 30 for attenuating noise. And, the septums 70 may be added to a conventional daisy-type annular mixer assembly for suppressing sound generated at the confluence of the bypass air through the bypass duct 28 and the exhaust gases 30 discharged from the LPT 22.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A mixer for mixing airflow with exhaust gases generated in a gas turbine engine comprising:
   at least one generally U-shaped chute having first and second longitudinally extending and transversely spaced apart sidewalls joined together at a leading edge over which are flowable said exhaust gases, and defining therebetween a first channel for channeling said airflow;
   said first and second sidewalls further having first and second trailing edges defining therebetween an elongate chute outlet for discharging said airflow from said chute for mixing with said exhaust gases; and
   said first trailing edge being spaced longitudinally downstream from said second trailing edge for defining a septum in said first sidewall extending downstream from said second trailing edge, said septum having a plurality of spaced apart apertures for attenuating noise generated upon mixing of said exhaust gases and said airflow.

2. A mixer according to claim 1 wherein said apertures extend through said septum and are disposed downstream of said second trailing edge of said second sidewall.

3. A mixer according to claim 2 further comprising a plurality of said chutes transversely spaced apart from each other with said first and second sidewalls of adjacent ones of said chutes facing each other for defining therebetween a second channel for channeling said exhaust gases therebetween; and wherein
   said first trailing edges of said chutes are transversely aligned in a first common plane;
   said second trailing edges of said chutes are transversely aligned in a second common plane disposed upstream of said first common plane; and
   said septums of said adjacent chutes face each other without obstruction from said chute second trailing edges.

4. A mixer according to claim 3 wherein each of said septums has a longitudinal length, and each of said second channels has a transverse width between said adjacent first and second sidewalls, and the ratio of said septum length to said second channel width is predetermined for allowing pressure waves generated at said chute second trailing edge to reflect off said septum for attenuating noise.

5. A mixer according to claim 4 wherein said ratio of said septum length to said second channel width is greater than about 2.0.

6. A mixer according to claim 4 wherein said septum apertures have an area porosity of up to about 10% and wherein individual ones of said septum apertures are sized and spaced apart from one another so as to produce noise canceling reflection waves.

7. A mixer according to claim 4 wherein said chute first and second sidewalls are generally triangular, and said chute leading edge is inclined relative to said chute first and second trailing edges, wherein said septum is rigidly joined to a remainder of said first sidewall.

8. A mixer according to claim 7 wherein said chute first and second sidewalls have top edges extending from said leading edge to said first and second trailing edges, respectively, and being spaced apart to define a chute inlet for receiving said airflow.

9. A mixer according to claim 8 in combination with a 2-D exhaust nozzle and wherein:
   said chutes are laterally spaced apart with said chute inlets being aligned in a common plane; and
   said chutes are disposed at an upstream end of said exhaust nozzle and are selectively extendable inwardly into said exhaust gases flowable through said exhaust nozzle.

10. A mixer according to claim 9 wherein said exhaust nozzle includes an ejector having an inlet for receiving ambient airflow from outside said engine, said ejector inlet being disposed in flow communication with said chute inlets for channeling said airflow thereto.

11. A mixer for mixing airflow with exhaust gases generated in a gas turbine engine comprising:

at least one generally U-shaped chute having first and second longitudinally extending and transversely spaced apart sidewalls joined together at a leading edge over which are flowable said exhaust gases, and defining therebetween a first channel for channeling said airflow;

said first and second sidewalls further having first and second trailing edges defining therebetween a chute outlet for discharging said airflow from said chute for mixing with said exhaust gases; and said first trailing edge being spaced longitudinally downstream from said second trailing edge for defining a septum in said first sidewall extending downstream from said second trailing edge, said septum having a plurality of spaced apart apertures for attenuating noise generated upon mixing of said exhaust gases and said airflow, wherein said apertures extend through said septum; and a plurality of said chutes transversely spaced apart from each other with said first and second sidewalls of adjacent ones of said chutes facing each other for defining therebetween a second channel for channeling said exhaust gases therebetween; and wherein said first trailing edges of said chutes are transversely aligned in a first common plane;

said second trailing edges of said chutes are transversely aligned in a second common plane disposed upstream of said first common plane;

said septums of said adjacent chutes face each other without obstruction from said chute second trailing edges; and said second channel is in the form of a converging-diverging channel having a chute throat defined between said first and second sidewalls of said adjacent chutes.

* * * * *